Figure 1:
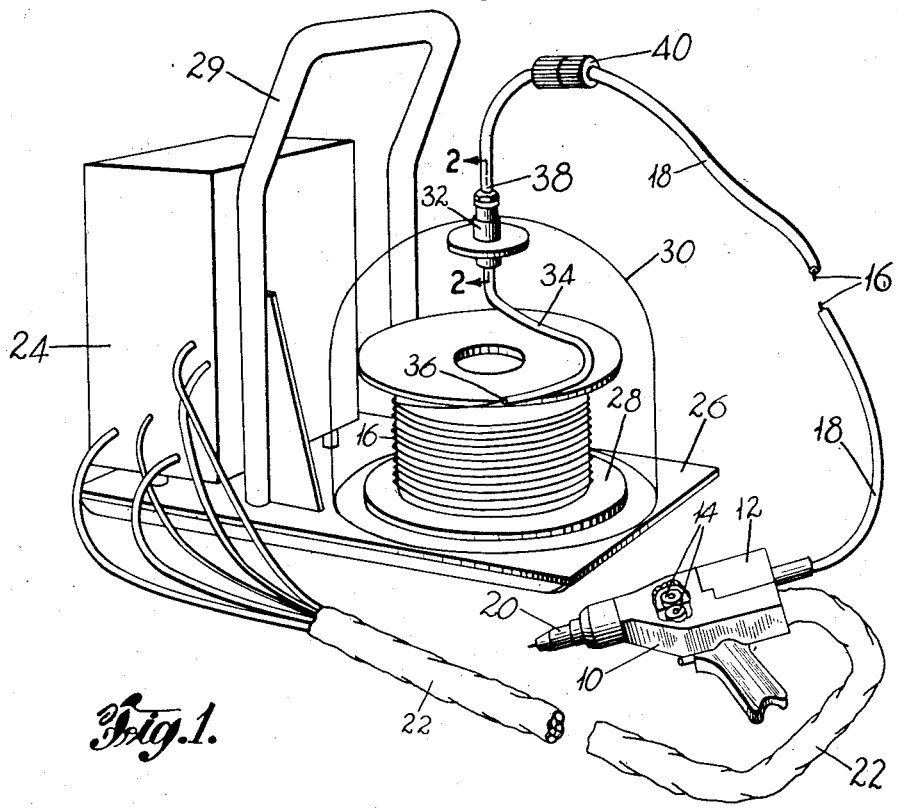

March 31, 1959     A. W. BAIRD     2,880,305

WELDING WIRE FEED

Filed April 24, 1958

INVENTOR.
ALBERT W. BAIRD
BY
Richard S. Shreve
ATTORNEY

2,880,305
WELDING WIRE FEED

Albert W. Baird, Cranford, N.J., assignor to Union Carbide Corporation, a corporation of New York Application April 24, 1958, Serial No. 730,599

2 Claims. (Cl. 219—130)

This invention relates to welding wire feed for inert gas shielded metal arc welding, and more particularly to the feed of welding wire by a portable hand gun having rollers which pull the wire through a flexible conduit, and having supply lines for shielding gas and welding current.

Since the advent of the McElrath Patent No. 2,606,267 there has been an increasing demand for smaller diameter welding wires and for wires of softer materials. With soft, small-diameter wires, the wire may break or deform. When starting a sigma weld with .020-inch aluminum wire, the wire-feed rate increases from 0 to 750 i.p.m. almost instantaneously. This sudden pull by the drive roll, coupled with the resisting inertia of the conventional spool of wire, frequently cause the wire to pull apart. Another inertia effect is the slippage of the feed rolls which causes shaving of small splinters of metal from the wire. These shavings tend to wedge in the guide tube and cause a burnback.

The main objects of the present invention are, therefore, to avoid this difficulty and to provide welding wire feed from a reel through a flexible conduit and pulling the wire out of the conduit on to the welding current contact, capable of quick starts and stops and continuous operation without buckling or parting the wire.

According to the present invention, the flexible conduit is connected to a hollow bearing on a casing for a stationary wire reel and aligned with the axis of the reel, and one end of a rotary unwind tube is journaled in said bearing and curves therefrom concave toward the oncoming wire and terminates in an open end outside the periphery of the reel to receive welding wire therefrom and to be rotated with respect thereto by the pull of the gun rollers on the wire unwound from the reel and passing through the bearing and flexible conduit. Preferably the bearing is connected to the flexible conduit by a rigid delivery tube pivoted adjacent to said bearing to receive wire from the unwind tube, and coupled to the flexible conduit to swing therewith in response to movement of the gun.

Figure 2:
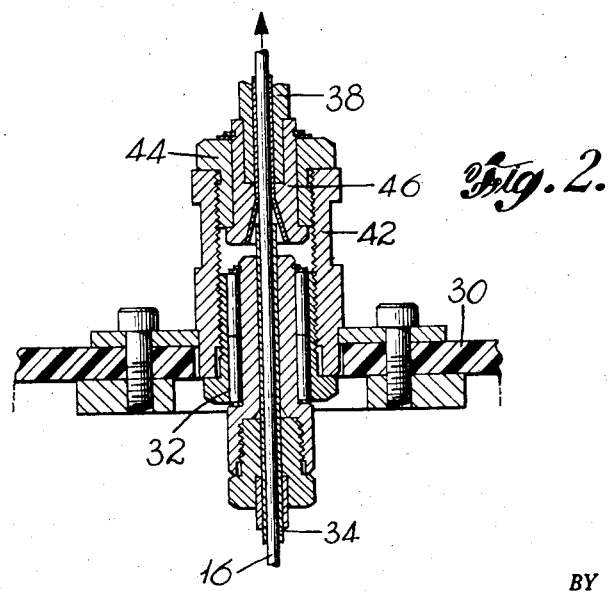

In the drawings:

Fig. 1 is a perspective view of apparatus for welding wire feed according to the present invention; and Fig. 2 is a vertical axis section taken along the line 2—2 of Fig. 1.

The portable hand welding gun 10 is of the type shown in the aforesaid McElrath patent, or in the Hudson and Royer Patent No. 2,808,498 and comprises a motor 12 for driving feed rollers 14 which pull the welding wire 16 through a flexible conduit 18, and push it on past a welding contact or through a guide tube and out through the gas directing nozzle 20. Supply lines for welding current, motor drive and shielding gas are contained in a flexible cable 22 leading from a control box 24.

The control box 24 is mounted on a base 26 which supports a stationary welding wire reel 28, and is provided with a carrying handle 29 located in a weight balanced position. The reel 28 is enclosed in a casing 30, on which is mounted a hollow bearing 32 aligned with the axis of the stationary reel 28 therebelow.

A rotary unwind tube 34 has one end journaled in the bearing 32 and curves therefrom concave toward the oncoming wire 16 and terminates in an open end 36 outside the periphery of the reel 28 to receive the wire 16 therefrom and be rotated with respect thereto by the pull of the gun rollers 14 on the wire 16 unwound from the reel 28 and passing through the bearing 32 and the flexible conduit 18.

Pivoted adjacent the bearing 32, preferably on an axis aligned therewith, is a rigid delivery tube 38 to receive wire 16 from the unwind tube 34. A coupling 40 connects the delivery end of this tube to the inlet end of the flexible conduit 18, so that the delivery tube 38 will swing about its pivot with the flexible conduit 18 in response to movement of the gun 10.

As shown in Fig. 1, the casing 30 is of transparent material, preferably plastic, so that the operation of the unwind tube is clearly visible therethrough. A sleeve 42 passes through the top of the casing, and the bearing 32 is mounted in the bottom of the sleeve 42 to journal the unwind tube 34. The top of the sleeve 42 receives a pivotal bearing 44 for a hollow pintle 46 which forms the inlet end of the rigid delivery tube 38.

What is claimed is:

1. Apparatus for gas shielded metal arc welding comprising a portable hand gun having welding wire feed means therein, a flexible conduit coupled to said gun through which said feed means pull the welding wire, a casing for a stationary wire reel, a hollow bearing on said casing aligned with the axis of said stationary reel through which the wire passes to said flexible conduit, a rotary unwind tube having one end journaled in said bearing and curving therefrom concave toward the oncoming wire and terminating in an open end outside the periphery of said stationary reel to receive welding wire therefrom and to be rotated with respect thereto by the pull of said feed means on the wire unwound from said reel and passing through said bearing and flexible conduit.

2. Apparatus for gas shielded metal arc welding with wire fed by a portable hand gun having feed means which pull the wire through a flexible conduit, comprising a casing, a wire supply reel stationary in said casing, a bearing on said casing aligned with the axis of said stationary reel, a curved rotary unwind tube journaled in said bearing to receive wire from said reel and be rotated by the pull of said feed means on the wire unwound from said reel, and a rigid delivery tube pivoted adjacent to said bearing to receive wire from said unwind tube and coupled to said flexible conduit to swing therewith in response to movement of said gun.

References Cited in the file of this patent

UNITED STATES PATENTS

| Number | Name | Date |
|---|---|---|
| 1,137,133 | Hanelback | Apr. 27, 1915 |
| 1,312,058 | Smirle | Aug. 5, 1919 |
| 2,286,460 | Brown | June 16, 1942 |
| 2,606,267 | McElrath | Aug. 5, 1952 |
| 2,719,245 | Anderson | Sept. 27, 1955 |